United States Patent [19]

Cameron et al.

[11] Patent Number: 5,751,573
[45] Date of Patent: May 12, 1998

[54] PATH PLANNING IN AN UNCERTAIN ENVIRONMENT

[75] Inventors: Alexander John Cameron, Tarrytown; Leendert Dorst, Mt. Kisco, both of N.Y.

[73] Assignee: Philips Electronics North America Corporation, New York, N.Y.

[21] Appl. No.: 187,370

[22] Filed: Jan. 27, 1994

Related U.S. Application Data

[63] Continuation of Ser. No. 805,234, Dec. 11, 1991, abandoned, which is a continuation-in-part of Ser. No. 617,303, Nov. 16, 1990, and a continuation-in-part of Ser. No. 508,024, Apr. 11, 1990.

[51] Int. Cl.[6] .................................................. G06F 19/00
[52] U.S. Cl. .................. 364/167.01; 364/424.031; 364/444.2; 395/90
[58] Field of Search ................. 364/148, 167.01, 364/424.01, 424.02, 424.2, 461, 460, 424.027, 424.028, 424.029, 424.031, 444.1, 444.2; 340/932.2; 901/1, 50; 318/587, 568.12; 395/90, 80, 919, 902–904, 912

[56] References Cited

U.S. PATENT DOCUMENTS

| | | | |
|---|---|---|---|
| 4,674,048 | 6/1987 | Okumura | 364/424.02 |
| 4,764,873 | 8/1988 | Libby | 364/461 |
| 4,862,373 | 8/1989 | Meng | 364/461 X |
| 4,888,707 | 12/1989 | Shimada | 364/461 X |
| 4,962,458 | 10/1990 | Verstraete | 364/443 |
| 5,150,452 | 9/1992 | Pollack et al. | 364/461 X |

FOREIGN PATENT DOCUMENTS

| | | | |
|---|---|---|---|
| 0375055 | 6/1990 | European Pat. Off. | G05D 1/02 |

OTHER PUBLICATIONS

Dorst et al., "The Geometrical Structure of Path Planning Problems", Intelligent Autonomous Systems, vol. 2, pp. 155–167, Amsterdam 1989.

Dorst et al., "Optimal Path Planning By Cost Wave Propagation In Metric Configuration Space", Mobile Robots III, SPIE Proceedings, vol. 1007, pp. 186–197; Nov. 1988.

Khatib, "Real–Time Obstacle Avoidance For Manipulators And Mobile Robots", Int. J. Robotics Research, 5(1):90–98, 1986.

Trovato, "Differential A*: An Adaptive Search Method Illustrated With Robot Path Planning For Moving Obstacles and Goals, and An Uncertain Environment", IEEE Tools for AI, pp. 624–639, Fairfax, VA Oct. 1989.

*Primary Examiner*—Joseph Ruggiero
*Attorney, Agent, or Firm*—Anne E. Barschall

[57] ABSTRACT

Configuration spaces, representing alternate possibilities for an environment in which an object is to move, are combined to create a probabilistic representation of all of the alternate possibilities. The probabilistic representation is used to plan optimal motion, with uncertainties being resolved at sensing points.

20 Claims, 6 Drawing Sheets

PATH PLANNING IN AN UNCERTAIN ENVIRONMENT

This is a continuation of application Ser. No. 07/805,234, filed on Dec. 11, 1991 now abandoned, which is a C-I-P of Ser. No. 07/617,303 filed Nov. 16, 1990 and a C-I-P of Ser. No. 07/508,024 filed Apr. 11, 1990.

A portion of the disclosure of this patent document contains material which is subject to copyright protection. The copyright owner has no objection to the facsimile reproduction by anyone of the patent document or the patent disclosure, as it appears in the Patent and Trademark Office patent file or records after issuance of the patent or after the application is laid open for inspection, but otherwise reserves all copyright rights whatsoever.

1.0 BACKGROUND OF THE INVENTION

1.1 Field of the Invention

The present application relates to path planning in an uncertain environment.

1.2 Related Art

The field of path planning attracts a great deal of attention within the robotics community, particularly with regard to mobile robots. The ability to select a (preferably optimal) path between its current location and a goal represents an important capability for a machine which is to operate in an autonomous manner.

The previous work in path planning has made one of two assumptions about the knowledge of the environment in which the navigation is to be performed: either the environment is completely known, together with the location of the robot and the goal, in which case the path can be found by an exhaustive search prior to any motion; or the environment is completely unknown, in which case the robot uses heuristics to attempt to reach the goal if it finds the direct path blocked by an obstacle. While both these situations model possible scenarios, another scenario which has received little attention occurs when significant, but incomplete, knowledge is possessed about the environment.

In the parent application, 7/508,024, an incompletely known environment was dealt with by trial and error, differentially budding from each state found to be occupied by an obstacle. This technique seldom gave an optimal solution.

In the case where the nature of an obstacle is known, and simply its presence or absence needs to be determined, a technique is required to determine a path which is optimal given current knowledge.

1.3 Bibliography

The following are a list of papers giving technical background.

1.3.1 J. F. Canny, *The Complexity of Robot Motion Planning*. MIT Press 1988.

Shows algorithmic solutions to particular problems, such as the "piano-movers' problem", where a 3-D polyhedron is moved between static polyhedral obstacles. These algorithmic solutions are based on advanced exact analysis of mathematical surfaces in high-dimensional configuration spaces, and the emphasis is on finding a solution rather than an optimal solution. The complexity of these algorithms is high, and they are not likely to be useable in practical situations.

1.3.2 Dorst et al., "The Geometrical Structure of Path Planning Problems", Intelligent Autonomous Systems Vol. 2, pp.155–167, Amsterdam 1989.

Deals with cost wave propagation in configuration space.

1.3.3 Dorst et al, "Optimal path planning by cost wave propagation in metric configuration spaces", Mobile Robots III, SPIE proceedings, vol. 1007, pp. 186–197.

1.3.4 J. T. Schwartz et al. (ed.), *Planning, Geometry and Complexity of Robot Motion*, Ablex Series in Artificial Intelligence, Norwood, N.J. 1986.

Shows algorithmic solutions to particular problems, such as the "piano-movers' problem", where a 3-D polyhedron is moved between static polyhedral obstacles. These algorithmic solutions are based on advanced exact analysis of mathematical surfaces in high-dimensional configuration spaces, and the emphasis is on finding a solution rather than an optimal solution. The complexity of these algorithms is high, and they are not likely to be useable in practical situations.

1.3.5 O. Khatib, "Real-time obstacle avoidance for manipulators and mobile robots", Int. J. Robotics Research, 5(1):90–98, 1986

A potential field approach. In configuration space, artificial force fields are constructed: the goal point attracts the state point, and obstacle points repel it. These force fields are derived by gradients from potential fields. The method is fast, but has problems with local minima where the forces cancel. Calculated paths may not be optimal.

1.3.6 D. E. Koditschek, "The control of natural motion in mechanical systems. Part I: navigation functions." Internal Report. Yale Univ. 1989.

Research trying to find minima free potential fields.

1.3.7 K. I. Trovato, "Differential A*: an adaptive search method illustrated with robot path planning for moving obstacles and goals, and an uncertain environment", In IEEE Tools for AI, pages 624–639, Fairfax Va. Oct. 1989.

Relates to differential budding.

2.0 SUMMARY OF THE INVENTION

The object of the invention is to find a technique which is optimal in view of current knowledge and is capable of incorporating new knowledge.

In one embodiment, alternative configuration spaces are filled with values based on one of: presence of an obstacle, absence of an obstacle, and cost to goal values which take into account the likelihood of finding the obstacle. The space generated using a combination of all possibilities is used to plan motion of the object until a sensing point is reached. Once that point is reached, a different configuration space, based on either presence or absence of the obstacle is used, depending on whether presence or absence of the obstacle is sensed at the sensing point.

3.0 BRIEF DESCRIPTION OF THE DRAWING

The invention will now be described by way of non-limitative example with reference to the following figures.

4.0 DETAILED DESCRIPTION OF THE PREFERRED EMBODIMENTS

Figure 1:
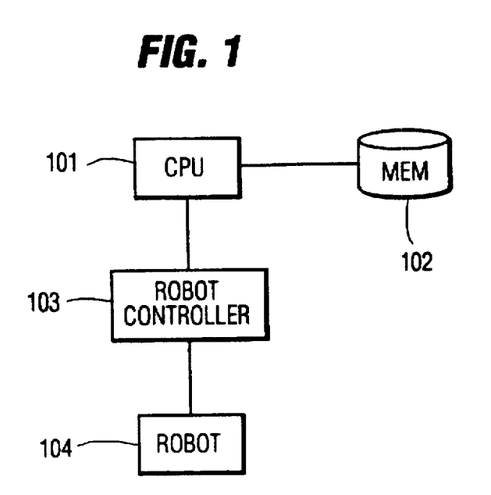
FIG. 1 is a block diagram of an apparatus incorporating the invention.

FIG. 1 shows a CPU 101 connected with a memory 102, which memory 102 stores at least one configuration space data structure as disclosed in the parent applications. The CPU 101 fills the configuration space data structure with cost to goal and direction arrows values and derives a path in the configuration space based on these values. The CPU translates the path in the configuration space to set points for a robot 104. The set points are transmitted from the CPU to the robot controller 103. The robot controller 103 controls the robot 104 based on these set points.

Figure 2:
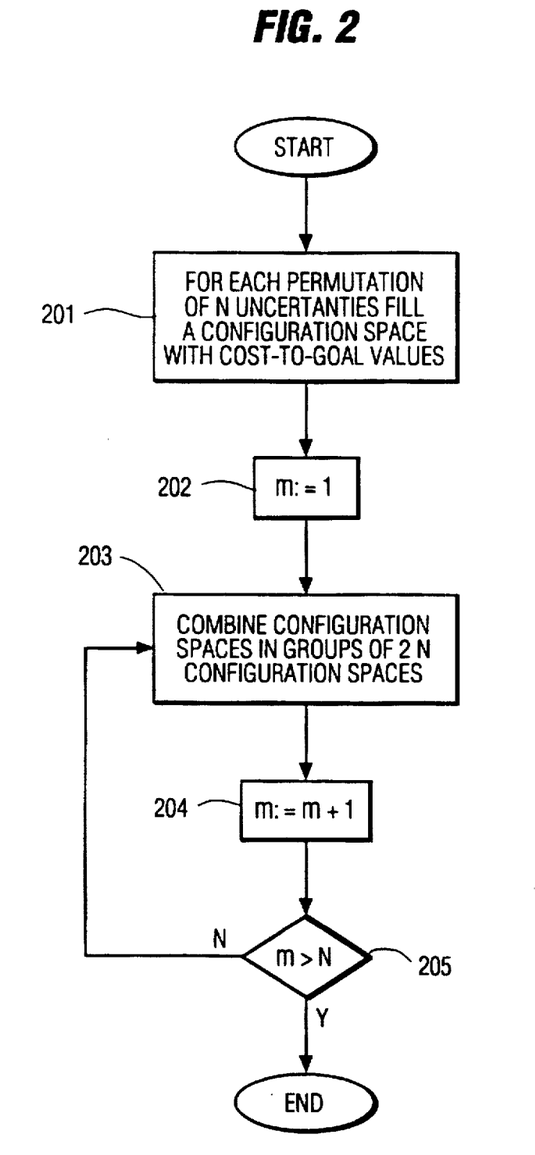
FIG. 2 is a flow chart of a first part of a method according to the invention.

FIG. 2 shows a first part of a method according to the invention to deal with uncertainties in the configuration space. At 201, a program executing on the CPU fills $2^N$ configuration spaces with cost to goal values, corresponding to all of the permutations of each of the obstacles being present or absent. Box 201 can occur using the method of U.S. Application Ser. No. 7/617,303 for each permutation. At 202 the program sets a counter m to 1. At 203, configuration spaces are combined in groups of 2·m.

When m is 1, the initial N configuration spaces are combined pairwise. Each pair of spaces to be combined contains cost to goal values resulting from assumption of presence or absence of a current uncertainty.

In box 204, the counter m is incremented by one. In box 205, the method tests whether the counter m is greater than N, the number of uncertainties. If m is not greater than N, the method returns to box 203. Otherwise the method ends.

On revisiting box 203, the method deals with $^N C_{(m-1)} \cdot 2^{N-(m-1)}$ configuration spaces, combining them in groups of 2·m, where $^N C_m$ is the number of combinations of m uncertainties in a set of N uncertainties. Each group of 2·m configuration spaces represents possibilities resulting from presence or absence of a group of m uncertainties.

Figure 3:
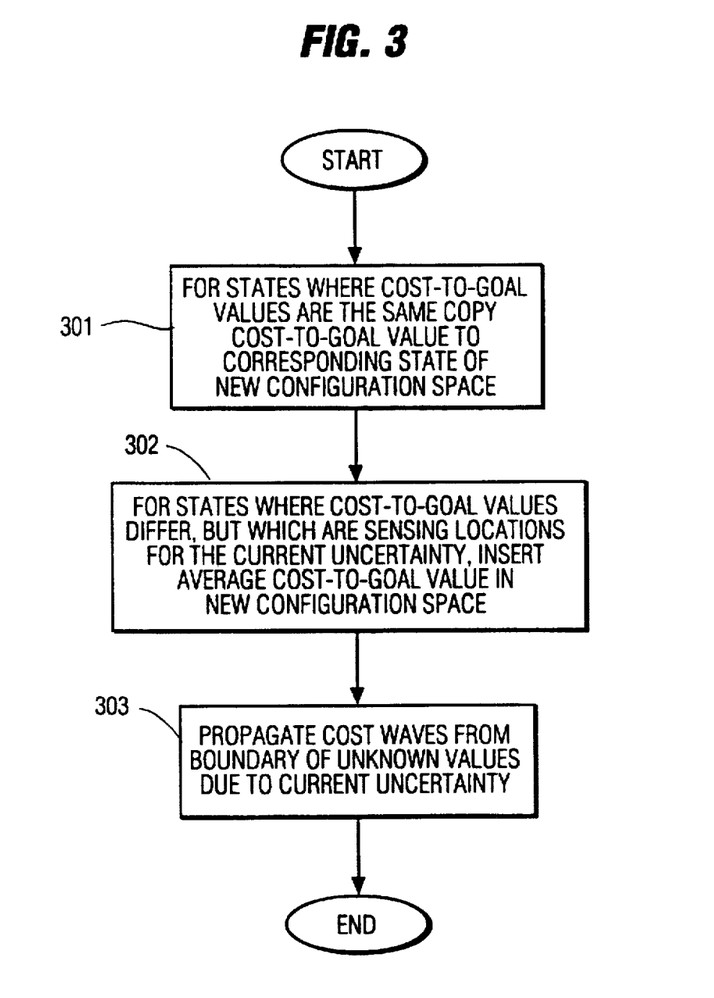
FIG. 3 is a flow chart expanding part of FIG. 2.

FIG. 3 expands box 203 of FIG. 2, stating how to combine configuration spaces. In box 301, in states where cost-to-goal values are the same, the cost-to-goal value is copied to the corresponding state of a result configuration space. In box 302, where cost to goal values differ, but which are "sensing locations", i.e. locations where the presence or absence of an uncertainty can be sensed, average cost to goal values are inserted in the new configuration space. The average cost to goal values are weighted averages taking into account the probability of the presence of the uncertainty, and preferably also the cost of sensing the presence of the uncertainty. Hence, after box 302, the cost at the sensing points will be determined according to the following equation when two configuration spaces are to be combined:

CG(at sensing point):=CG(pathtail1)·p(uncertainty present)
+CG(pathtail2)·p(uncertainty absent)+C where CG is a function calculating cost to goal values; pathtail1 is a variable representing the path from the sensing point to the goal in the presence of that which causes the uncertainty; pathtail2 is a variable representing the path from the sensing point to the goal in the absence of that which causes the uncertainty; p is a function calculating the probability of occurrence of its argument; and C is a variable representing the cost of sensing presence or absence of the uncertainty. The C term in the above equation can be ignored if the cost of sensing is insignificant. C and p may be functions of position in the configuration space and of time. For instance, in the case of planning the path of an automobile, traffic at one point may give an indication of a blockage at another point. In such a case, p is position dependent. Moreover, it may be determined whether an automobile is likely to pass a point of probable traffic congestion before the onset of rush hour, based on the current time and a current position of the automobile. In such a case, p is both position and time dependent.

Then in box 303, cost waves are propagated from the boundary of the area of unknown values due to the current uncertainty, for instance using the method of differential budding of U.S. application Ser. No. 7/508,024.

Figure 4:
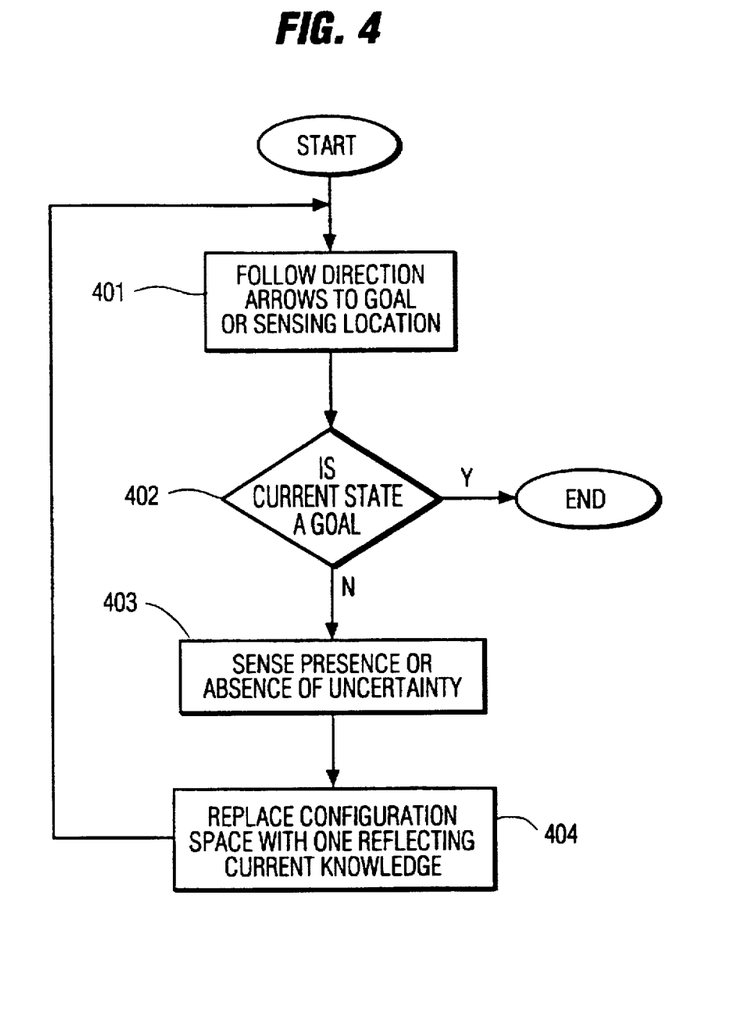
FIG. 4 is a flow chart showing how to use the configuration spaces generated according to the method of FIGS. 2 and 3.

Once all of the configuration spaces are generated as a result of the method of FIGS. 2 and 3, a path is generated by the CPU according to FIG. 4. In box 401, the CPU starts at a starting point in the final configuration space generated at the end of FIG. 2 and follows the direction arrows to a goal or sensing location. At the stopping point, at box 402, the CPU tests whether the current state is a goal state. If so, the path is found. If not, the CPU requests the robot to sense the presence or or absence of an uncertainty relevant to the current sensing point. After the robot has done this, the configuration space being used is replaced with one of the intermediate configuration spaces generated in the method of FIG. 2 which reflects the new knowledge sensed by the robot. Control is then returned to box 401.

Figure 5:
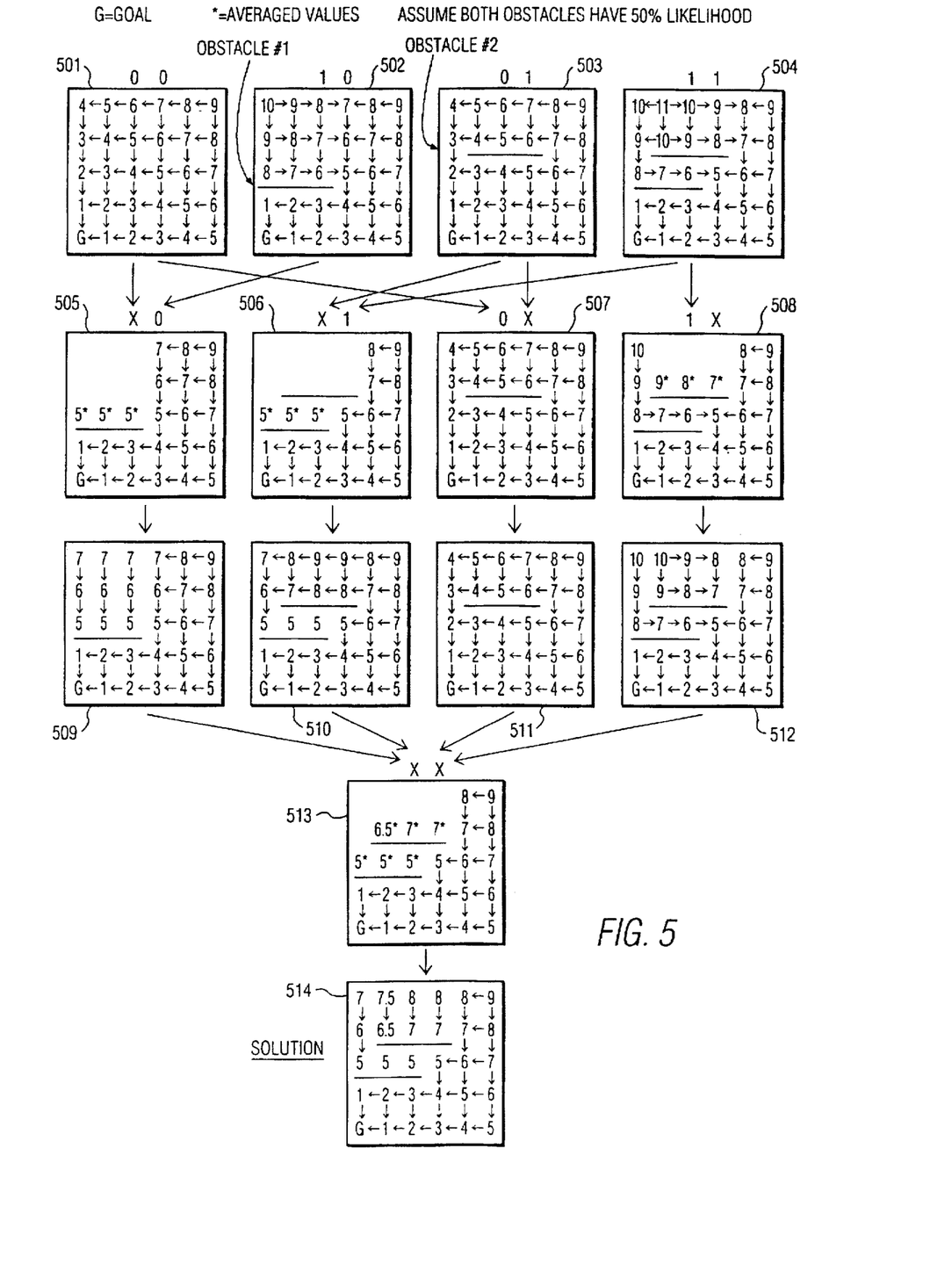
FIG. 5 shows some simple con figuration spaces generated according to the method of FIG. 2.

FIG. 5 gives a simple example of the operation of the method of FIG. 2. In this case we have a simple configuration space with five rows and six columns. There are two uncertainties, both of which are obstacles, and both of which have a 50% probability of being present. Obstacle #1 is located between the third and fourth rows of the configuration space and extending through the first three columns. Obstacle #2 is located between the second and third rows of the configuration space and extends through the second through fourth columns. There is assumed to be no cost associated with sensing.

On the first line of the figure, configuration spaces 501, 502, 503, and 504 represent the result of box 201 of FIG. 2. Space 501 shows a simple distance metric with no obstacles. 502 shows the space of 501 with obstacle #1 added. 503 shows the space of 501 with obstacle #2 added. 504 shows the space of 501 with both obstacles 1 and 2 added. The column headings for this line represent the certain knowledge regarding the obstacles. Thus 00 means that both obstacles are absent; 10 that obstacle #1 is present and obstacle #2 is absent; 01 that obstacle #1 is absent and obstacle #2 is present; and 11 that both obstacles are present.

On the second line of the figure, configuration spaces 505, 506, 507, and 508 represent the output of step 302 in the first iteration of box 203. Thus box 505 results from the pairwise combination of boxes 501 and 502; box 506 results from the pairwise combination of boxes 503 and 504; box 507 results from the pairwise combination of boxes 501 and 503; and box 508 results from the pairwise combination of boxes 502 and 504. Because the probabilities of both obstacles are 50%, the values inserted at the sensing points, e.g. row 3, col.s 1–3 of box 505, are simple averages of the values in the spaces to be combined, i.e. 501 and 502 in the case of box 505. The column headings in this row represent partial knowledge about the obstacles. Thus X0 means that obstacle #2 is absent, but obstacle #1 is uncertain; X1 that obstacle #2 is present, but obstacle #1 is uncertain; 0X that obstacle #1 is absent, but obstacle #2 is uncertain; and 1X that obstacle #1 is present, but obstacle #2 is uncertain.

On the third line of the figure, the configuration spaces 509, 510, 511, and 512 represent the output of step 303 in the first iteration of box 203.

On the fourth line of the figure, the configuration space 513 represents the output of step 302 in the second iteration of box 204. In other words, box 513 is a four way combination of the spaces of boxes 509, 510, 511, and 512. The heading XX over box 513 represents uncertainty in both the obstacles.

Box 514, the solution space, is the result of step 303 in the second iteration of box 203.

Now box 514 can be used to plan a path according to the method of FIG. 4, as follows.

It is assumed that the start point is in the first row, third column. The direction arrows are followed from this point to row 2, column 3. This is a sensing point. Here the path terminates, because there is no path leading out of this location. At this point, it is now assumed that presence of the obstacle is sensed. This corresponds to box 510, symbolized by X1 in the column heading above box 506, because the second obstacle is present, but the first obstacle is still uncertain.

The direction arrows are then followed through row 2 to row 3, column 1. Since the path terminates here, and the goal has not been reached, a sensing point has again been reached. It is now assumed that the first obstacle is absent. This corresponds to box 503, symbolized by 01 in the column heading above box 503. Now the direction arrows can be followed along column 1 to the goal at row 6, column 1.

In the limit as the size of the discretization approaches zero, the cost to goal values in the configuration space can be shown to be the expected values of the cost to goal given the probabilities of occurrence of the various uncertainties.

The formula for the number of configuration spaced used, in general, with N obstacles, is $3^N$. An examination of FIG. 5 will show that the method of the preferred embodiment uses $3^N=9$ configuration spaces: 501, 502, 503, 504, 509, 510, 511, 512, and 514. The other configuration spaces shown in the figure are just intermediate results.

Figure 6:
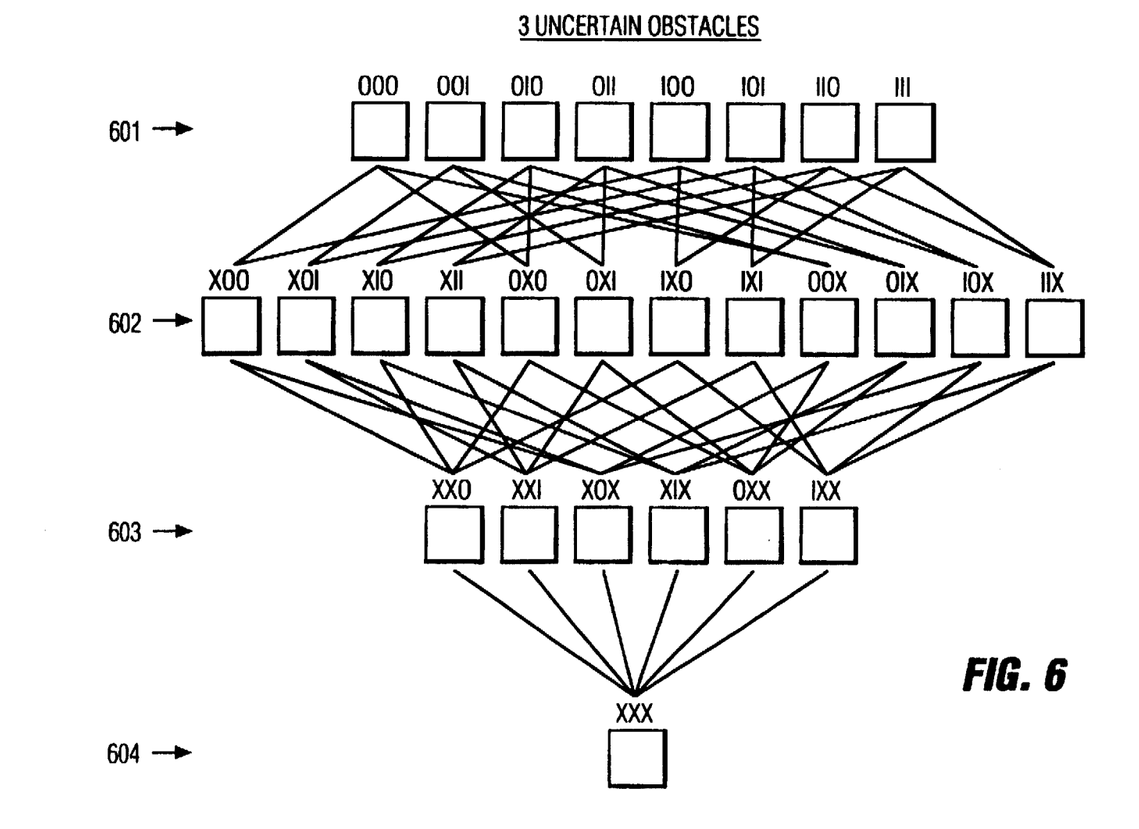
FIG. 6 shows how configuration spaces are generated for 3 uncertain obstacles.

FIG. 6 outlines the results of the method of FIG. 2 when applied to a situation having three uncertain obstacles. FIG. 6 is thus analogous to FIG. 5, not showing the details of the contents of the configuration spaces.

On the first line of the figure, 601, $$^3C_0 2^3 = 8$$

configuration spaces are filled with cost to goal and direction arrows values. Each box in line 601 corresponds to one permutation of the uncertain obstacles. Thus the box marked 000 corresponds to the configuration space with none of the obstacles present; the box labeled 001 corresponds to the configuration space with a third one of the obstacles present and the first and second obstacles not present; and so forth.

The second line of the figure, 602, shows the result of applying a first iteration of the method of FIG. 3, i.e. to the configuration spaces of line 601. Each box of line 602 corresponds to a pairwise combination of the boxes of line 601, giving $$^3C_1 2^2 = 12$$

configuration spaces. Thus, the box marked X00 corresponds to the situation where the second and third obstacles are known to be absent, but the first obstacle is uncertain; the box marked X01 corresponds to the situation where the first obstacle is uncertain, the second obstacle is known to be absent, and the third obstacle is known to be present; and so forth.

The third line of the figure, 603, shows the result of applying a second iteration of the method of FIG. 3, i.e. to the configuration spaces of line 602. Each box of line 603 corresponds to a combination of four of the boxes of line 602, giving $$^3C_2 2^1 = 6$$

configuration spaces. Thus, the box marked XX0 corresponds to the situation where the third obstacle is known to be absent, but the first and second obstacles are uncertain; the box marked XX1 corresponds to the situation where the third obstacle is known to be present but the first and second obstacles are uncertain; and so forth.

The fourth line of the figure, 604, shows the result of applying the final iteration of the method of FIG. 3, i.e. to the configuration spaces of line 603. The box of line 604 corresponds to a combination of 6 configuration spaces giving $$^3C_3 2^0 = 1,$$

i.e. a single configuration space, corresponding to the situation in which all of the obstacles are uncertain.

An examination of FIG. 6 shows that the method of the preferred embodiment uses $3^N=27$ configuration spaces.

Enclosed are relevant portions of the source code to implement the method of the preferred embodiment. This source code is in C.

---

```
Copyright - 1991 North American Philips Corporation
/******************************************************/
/* terminology:
/* Arrays consist of ELEMENTS, indicated by i,j and an el-type.
/* On the screen the elements are indicated by CELLS, which have an
/* x, y, xsize, ysize and a cell-type.
/* Types can be either SQUEL (a square cell depicting the ima[ ][ ]
/* and pnt[ ][ ] array), XTS (a rectangle representing an xts[ ][ ]
/* element, YTS (similar for yts[ ][ ]) or DCT (not used).
/* The canvas itself consists of POINTS, which have an x and y
/* coordinate.
/******************************************************/
typedef char LOGICAL;
typedef int PIXEL;
#define INFINITY 32767  /* code for infinite values */
PIXEL xts [XSIZE+1][YSIZE];  /* horizontal transition strengths */
PIXEL xuo [XSIZE+1][YSIZE];  /* horizontal uncertain obstacles */
PIXEL yts [XSIZE][YSIZE+1];  /* vertical transition strengths */
PIXEL yuo [XSIZE][YSIZE+1];  /* vertical uncertain obstacles */
/* This function is the highest level function, which sets up variables
/* and calls call_loop */
new_cdt( )
{
    register int i, j, ii, jj;
    register PIXEL mini, mi;
    PIXEL   new, old, pointer, constr;
    int     passnum;
    LOGICAL change;
    /* N (the number of uncertain obstacles) is known at this stage */
    pnt = (PIXEL *)malloc(int_pow(3,N) * XSIZE * YSIZE *
        sizeof(PIXEL));
    ima = (PIXEL *)malloc(int_pow(3,N) * (XSIZE+2*XMARG) *
        (YSIZE+2*YMARG) * sizeof(PIXEL));
    obs_set = (int *) malloc(N * sizeof(int));
    call_loop(0,N);
}
call_loop(i,j)
/* This routine performs the recursive generation of the 3^N
   configuration spaces. This routine is analogous to FIG. 2
   using recursion rather than iteration. */
int i, j;
{
    if (i < j) {
        *(obs_set+i) = 0;
        call_loop(i+1, j);
        *(obs_set+i) = 1;
        call_loop(i+1, j);
```

```
            *(obs_set+i) = 2;
            call_loop(i+1, j);
        }
        else calc_dist_fn( );
}
calc_dist_fn( )
/* This routine implements FIG. 3*/
{
int avg, pres, current, init_index;
int i, j, k, ii;
/* set index value -- number in base 3 where each digit 0, 1 or 2 */
/* corresponds to the presumed presence, absence or average or the */
/* corresponding obstacle */
/* init_index only takes digit values of 0 and 1 in the same base 3 */
/* number corresponding to presumed absence or otherwise for each */
/* obstacle */
index = 0;
init_index = 0;
for (i = 0; i < N; ++i) {
    index = 3*index + *(obs_set+i);
    init_index *= 3;
    if (*(obs_set+i))
        init_index += 1;
}
if (index == init_index) {
    /* no averaged obstacles -- start from scatch */
    init_im_array(*(ima+index));
    init_pt_array(*(pnt+index));
}
else {
    /* preset array and pointer array to that of init_index */
    preset(*(ima+index), *(ima+init_index), *(pnt+index),
        *(pnt+init_index));
    for (i = 0; i < N; ++i) {
        if (*(obs_set+i) == 2) {
            for (j=1; j<YSIZE+YMARG; j++)
                for (k=1; k<XSIZE+XMARG; k++)
                    if ((*(sens+i))[k-1][j-1]) {
                        /* if a sensing point, assign average value */
                        ii = int_pow(3,N-i-1);
                        current = (*(ima+index))[k][j];
                        pres = (*(ima+index-ii))[k][j];
                        avg = (*(ima+index-ii))[k][j] * *(prob+i)/100.0 +
                            (*(ima+index-2*ii))[k][j] * (1-*(prob+i)/100.0) + cost;
                        if ((pres < avg) && (pres < current)) {
                            (*(ima+index))[k][j] = pres;
                            (*(pnt+index))[k-1][j-1] = (*(pnt+index-ii))[k-1][j-1];
                        }
                        if ((pres < avg) && (pres == current)) {
                            (*(pnt+index))[k-1][j-1] |= (*(pnt+index-ii))[k-1][j-1];
                        }
                        if ((pres == avg) && (pres < current)) {
                            (*(ima+index))[k][j] = pres;
                            (*(pnt+index))[k-1][j-1] = (*(pnt+index-ii))[k-1][j-1];
                        }
                        if ((pres == avg) && (pres == current)) {
                            (*(pnt+index))[k-1][j-1] |= (*(pnt+index-ii))[k-1][j-1];
                        }
                        if ((avg < pres) && (avg < current)) {
                            (*(ima+index))[k][j] = avg;
                            (*(pnt+index))[k-1][j-1] = ((i+1) << 4);
                        }
                        if ((avg < pres) && (avg == current)) {
                            /* do nothing */
                        }
                    }
        }
        init_im_array(*(ima+index));
        init_pt_array(*(pnt+index));
    }
}
propagate(im_array, pt_array)
/* This routine propgates waves from current uncertainty as described
by box 303 in FIG. 3. */
PIXEL im_array[ ][YSIZE+2*YMARG];
im_array[ ][YSIZE+2*YMARG];
PIXEL pt_array[ ][YSIZE];
{
    register int i, j, ii, jj;
    register PIXEL mini, mi;
    PIXEL new, old, pointer, constr;
    int passnum, tmp_index;
    LOGICAL change;
    tmp_index = index;
    /* set obstacles if they are present or uncertain */
    for (i = N-1; i >= 0; --i) {
        if (tmp_index % 3) {
            if (!*(uobsxy+i))
                xts[*(uobsx+i)][*(uobsy+i)] = INFINITY;
            else yts[*(uobsx+i)][*(uobsy+i)] = INFINITY;
        }
        tmp_index /= 3;
    }
    change = TRUE;
    while (change) {
        change = FALSE;
        /* downward pass */
        for (j=YMARG; j<YSIZE+YMARG; j++)
            for (i=XMARG; i<XSIZE+XMARG; i++) {
                ii = i-XMARG;
                jj = j-YMARG;
                if ((constr=con[ii][jj]) != NOCONSTRAINT) {
                    im_array[i][j] = constr;
                    pt_array[ii][jj] = OBSTACLE;
                }
                else {
                    mini = old = im_array[i][j];
                    pointer = pt_array[ii][jj];
                    if ((mi = im_array[i-1][j] + xts[ii][jj]) < mini)
                        {mini = mi; pointer = XN;}
                    else if (mi == mini)
                        {pointer |= XN;}
                    if ((mi = im_array[i][j-1] + yts[ii][jj]) < mini)
                        {mini = mi; pointer = YN;}
                    else if (mi == mini)
                        {pointer |= YN;}
                    im_array[i][j] = new = mini;
                    pt_array[ii][jj] = pointer;
                    if (new != old) change = TRUE;
                }
            }
        /* upward pass */
        for (j=YSIZE+YMARG-1; j>YMARG-1; j--)
            for (i=XSIZE+XMARG-1; i>XMARG-1; i--) {
                ii = i-XMARG;
                jj = j-YMARG;
                if ((constr=con[ii][jj]) != NOCONSTRAINT) {
                    im_array[i][j] = constr;
                    pt_array[ii][jj] = OBSTACLE;
                }
                else {
                    mini = old = im_array[i][j];
                    pointer = pt_array[ii][jj];
                    if ((mi = im_array[i+1][j] + xts [ii+1][jj]) < mini)
                        {mini = mi; pointer = XP;}
                    else if (mi == mini)
                        {pointer |= XP;}
                    if ((mi = im_array[i][j+1] + yts[ii][jj+1]) < mini)
                        {mini = mi; pointer = YP;}
                    else if (mi == mini)
                        {pointer |= YP;}
                    im_array[i][j] = new = mini;
                    pt_array[ii][jj] = pointer;
                    if (new != old) change = TRUE;
                }
            }
    }
    tmp_index = index;
    /* reset uncertain obstacles */
    for (i = N-1; i >= 0; --i) {
        if (tmp_index % 3) {
            if (!*(uobsxy+i))
                xts[*(uobsx+i)][*(uobsy+i)] = UNITSTEP;
            else yts[*(uobsx+i)][(*(uobsy+j)] = UNITSTEP;
        }
        tmp_index /= 3;
    }
}
```

We claim:

1. A method for controlling an object in an environment having N uncertainties comprising the steps of
   a) starting from a plurality of configuration space representations, each configuration space representing cost to goal values for a possible environment of the object;
   b) combining the plurality of configuration space representations to yield a result configuration space representation;
   c) finding a path based on the result configuration space representation;
   d) controlling the object to follow the path.

2. The method of claim 1 wherein at least one of the uncertainties is an obstacle.

3. The method of claim 2 wherein the obstacle has a known probability of being present.

4. The method of claim 1 wherein at least one of the uncertainties is a goal.

5. The method of claim 4 wherein the goal has a known probability of being present.

6. The method of claim 1 wherein the starting step comprises initializing $2^N$ configuration space representations, each configuration space representation representing cost to goal values for a situation in which a single respective permutation of the uncertainties is present.

7. The method of claim 1 wherein the combining step comprises for N iterations, combining the configuration space representations in groups of size two multiplied by the number of iterations.

8. The method of claim 7 wherein, within each iteration, the combining step comprises the following sub-steps:
   a) for each state having a respective common cost to goal value in all of the configuration space representations in a current group, setting a value of a corresponding state in an output configuration space representation to the respective common value;
   b) for each state, where cost to goal values differ between the configuration space representations in the current group, and which is a sensing location, inserting an average cost to goal value in a corresponding state in the output configuration space representation; and
   c) propagating cost waves in the output configuration space representation from the states affected by the inserting and setting step.

9. The method of claim 8 wherein the inserting step comprises calculating the average value according to the equation $$CG(\text{at sensing point}):=CG(\text{pathtail1}) \cdot p(\text{uncertainty present})+ CG(\text{pathtail2}) \cdot p(\text{uncertainty absent})$$

where CG is a function calculating cost to goal values; pathtail1 is a variable representing the path from the sensing point to the goal in the presence of that which causes the uncertainty; pathtail2 is a variable representing the path from the sensing point to the goal in the absence of that which causes the uncertainty; and p is a function calculating the probability of occurrence of its argument.

10. The method of claim 9 where p is a function of time.

11. The method of claim 9 where p is a function of location.

12. The method of claim 8 wherein the inserting step comprises calculating the average value according to the equation $$CG(\text{at sensing point}):=CG(\text{pathtail1}) \cdot p(\text{uncertainty present})+ CG(\text{pathtail2}) \cdot p(\text{uncertainty absent})+C$$

where CG is a function calculating cost to goal values; pathtail1 is a variable representing the path from the sensing point to the goal in the presence of that which causes the uncertainty; pathtail2 is a variable representing the path from the sensing point to the goal in the absence of that which causes the uncertainty; p is a function calculating the probability of occurrence of its argument; and C is a variable representing the cost of sensing presence or absence of the uncertainty.

13. The method of claim 12 where p is a function of time.

14. The method of claim 12 where p is a function of location.

15. The method of claim 12 where C is a function of time.

16. The method of claim 12 where C is a function of location.

17. The method of claim 1 wherein the finding step comprises
   i) following direction arrow values in the result configuration space representation to a state which is either a goal or a sensing point where a corresponding uncertainty can be resolved;
   ii) determining whether the point is a goal;
   iii) if a result of the determining step is negative, sensing presence or absence of that which causes the corresponding uncertainty; and
   iv) replacing the result configuration space representation with a configuration space representation reflecting current knowledge.

18. The method of claim 17 further comprising iterating steps i)–iv) until a goal state is reached.

19. Apparatus for controlling the motion of an object in an environment which has uncertainties comprising:
   a) means for combining a plurality of configuration space representations representing possible environments for the object to form a combined configuration space representation;
   b) means for storing the combined configuration space representation;
   b) means for calculating a path from the combined configuration space; and
   c) means responsive to the means for calculating for controlling the object to follow the path.

20. A method for controlling an object, of known position, to follow a path, the method comprising the steps of:
   storing a representation of a current or future environment of the object, in which environment the position of the object is taken as known, which representation includes values based on probabilities of conditions occurring in that environment, wherein the existence of said conditions is not known with certainty;
   planning the path based on the representation; and controlling the object to follow the path.

* * * * *